US010295382B2

(12) United States Patent
Williams et al.

(10) Patent No.: US 10,295,382 B2
(45) Date of Patent: May 21, 2019

(54) RETRACTABLE PILLAR SENSING SYSTEM

(71) Applicant: Toyota Motor Engineering & Manufacturing North America, Inc., Erlanger, KY (US)

(72) Inventors: Paxton S. Williams, Milan, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 177 days.

(21) Appl. No.: 15/178,763

(22) Filed: Jun. 10, 2016

(65) Prior Publication Data

US 2017/0356769 A1    Dec. 14, 2017

(51) Int. Cl.
*G01D 11/30* (2006.01)
*B60R 11/00* (2006.01)

(52) U.S. Cl.
CPC .............. *G01D 11/30* (2013.01); *B60R 11/00* (2013.01); *B60R 2011/004* (2013.01); *B60R 2011/0082* (2013.01); *B60R 2011/0092* (2013.01)

(58) Field of Classification Search
CPC ................. B60R 11/00; B60R 2011/00; B60R 2011/0082; B60R 2011/0092; G01D 11/30

USPC ......................... 293/117; 296/193.06; 701/45
See application file for complete search history.

(56) References Cited

U.S. PATENT DOCUMENTS

| 5,273,309 A | 12/1993 | Lau et al. |
| 5,718,451 A | 2/1998 | White |
| 6,095,553 A | 8/2000 | Chou et al. |
| 6,415,883 B1 * | 7/2002 | Myrholt .................. B60R 21/38 |
| | | 180/271 |
| 6,917,866 B2 | 7/2005 | Grotendiek et al. |
| 2007/0100527 A1 * | 5/2007 | Rao ........................ B60R 19/483 |
| | | 701/45 |

FOREIGN PATENT DOCUMENTS

DE         19835561 A1    2/2000

* cited by examiner

*Primary Examiner* — Joseph D. Pape
*Assistant Examiner* — Dana D Ivey
(74) *Attorney, Agent, or Firm* — Christopher G. Darrow; Darrow Mustafa PC (57) ABSTRACT

A vehicle sensor system includes a first sensor pod mounted to a pillar structure of the vehicle and a second sensor pod mounted to the pillar structure. A sensor pod deployment mechanism is operatively coupled to the first sensor pod and to the second sensor pod for deploying the first and second sensor pods from the pillar structure. The deployment mechanism is operable to move the first sensor pod between a stowed position and a deployed position of the first pod, and operable to move the second sensor pod between a stowed position and a deployed position of the second pod.

15 Claims, 6 Drawing Sheets

RETRACTABLE PILLAR SENSING SYSTEM

TECHNICAL FIELD

The embodiments described herein relate to sensors mountable along an exterior of a vehicle.

BACKGROUND

In autonomous and semi-autonomous vehicle, various types of sensors are necessary or desirable to aid the vehicle in performing driving assistance functions, for detecting a wide variety of driving conditions (such as the presence of nearby vehicles and pedestrians, various types of road conditions, etc.), and for other purposes. For various types of sensor applications, it may be desirable to elevate the sensors the greatest degree possible, to help obviate problems with sensor occlusion or blockage, and to maximize the field(s) of view or detection of the sensors. It may also be desirable to stow or conceal externally-mounted vehicle sensors when not in use. Currently, various vehicle sensors may be enclosed in one or more structures which are permanently mounted on the roof of the vehicle. However, such structures may be bulbous and aesthetically unpleasing, as well as aerodynamically detrimental to vehicle performance.

SUMMARY

In one aspect of the embodiments described herein, a vehicle sensor system is provided. The sensor system includes a first sensor pod mounted to a pillar structure of the vehicle, and a second sensor pod mounted to the pillar structure. A sensor pod deployment mechanism is operatively coupled to the first sensor pod and to the second sensor pod for deploying the first and second sensor pods. The deployment mechanism is operable to move the first sensor pod between a stowed position and a deployed position, and operable to move the second sensor pod between a stowed position and a deployed position.

In another aspect of the embodiments described herein, a sensor pod assembly is provided. The assembly includes a housing and a sensor pod movably mounted in the housing. The sensor pod is movable between a stowed position and a deployed position and includes at least one sensor mounted therein. A biasing mechanism is structured to bias the sensor pod toward the stowed position.

In another aspect of the embodiments described herein, a vehicle sensor system is provided. The sensor system includes a first sensor pod mounted to a pillar structure of the vehicle, and a stalk mounted within the pillar structure. The stalk is connected to the first sensor pod such that movement of the stalk a first distance within the pillar structure causes the first sensor pod to deploy.

DETAILED DESCRIPTION

Embodiments described herein relate to vehicle sensor pods containing sensors which are mounted in pillar structures of the vehicle. The sensor pods may be extended or deployed from retracted or stowed positions in which they are flush with the structures in which they are mounted. Movement of the sensor pods may be controlled using a motorized stalk which moves within the pillar to provide deployment and retraction of the sensor pods.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
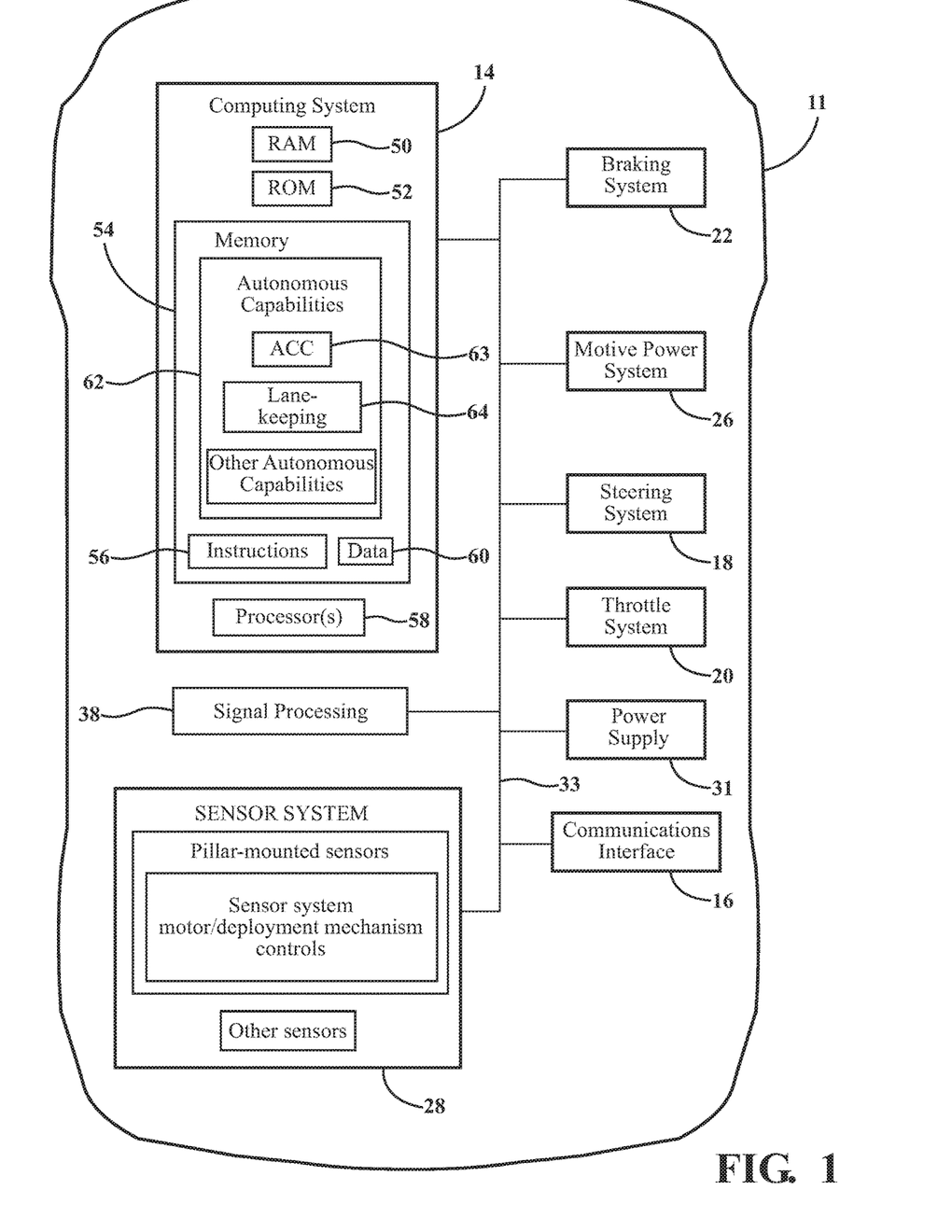
FIG. 1 is a functional block diagram illustrating a vehicle in accordance with an example embodiment.

FIG. 1 is a functional block diagram illustrating a vehicle 11 in accordance with an example embodiment. The vehicle 11 may be configured to operate fully or partially in an autonomous mode. While in autonomous mode, the vehicle 11 may be configured to operate without human interaction. The vehicle 11 may include various systems, subsystems and components in operative communication with each other, such as a sensor system or array 28, a computing system 14, one or more communications interfaces 16, a steering system 18, a throttle system 20, a braking system 22, a power supply 31, a motive power system 26, a sensor system 28, and other systems and components needed for operating the vehicle as described herein. The vehicle 11 may include more or fewer subsystems and each subsystem could include multiple elements. Further, each of the subsystems and elements of vehicle 11 could be interconnected.

The sensor system or array 28 may include a number of sensors configured to sense information about an external environment of the vehicle 11. For example, the sensor system 28 may include a navigation unit such as a Global Positioning System (GPS), an inertial measurement unit (IMU), a RADAR unit, a laser rangefinder/LIDAR unit, and one or more cameras comprising devices configured to capture a plurality of images of the interior of the vehicle and/or an external environment of the vehicle 11. The camera(s) may be still cameras or video cameras. The IMU may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the vehicle 11. Additional particular types of sensors may include any other types of sensors needed to perform the functions and operations described herein. One or more of the sensors included in the sensor system 28 may be configured to be actuated separately or collectively in order to modify a position, an orientation, or both, of the one or more sensors, as described herein.

In a known manner, the vehicle sensors 28 may provide data used by the computing system 14 in formulating and executing suitable control commands for the various vehicle systems. The vehicle 11 may include a suitable signal processing means 38 for situations where a sensor output signal or other signal requires pre-processing prior to use by the computing system 14 or another vehicle system or element, or where a control signal sent from the computing system will require processing prior to use by actuatable sub-systems or sub-system components (for example, components of the steering system or throttle system). The signal processing means may be an analog-to-digital (A/D) converter or digital-to-analog (D/A) converter, for example.

FIG. 1 illustrates a block diagram of an exemplary computing system according to one or more illustrative embodiments of the disclosure. The computing system 14 may be operatively connected to the other vehicle systems and elements and otherwise configured so as to affect control and operation of the vehicle 11 and its components as described herein. The computing system 14 may be configured to control at least some systems and/or components autonomously (without user input) and/or semi-autonomously (with some degree of user input). The computing system may also be configured to control and/or execute certain functions autonomously and/or semi-autonomously. For example, computing system 14 may be configured for implementing certain autonomous driving assistance capabilities (such as adaptive cruise control (ACC) 63 and lane-keeping 64, for example) responsive to sensor inputs. The computing system 14 may also be configured for deploying the various sensor pods described herein as needed, depending on such factors as the driving situations, the particular sensors mounted on each pod, and other pertinent factors. Computing system 14 may also be configured for retracting the various pods when their associated sensors not in use.

The computing system 14 may have some or all of the elements shown in FIG. 1. In addition, the computing system 14 may also include additional components as needed or desired for particular applications. The computing system 14 may also represent or be embodied in a plurality of controllers or computing devices that may process information and/or serve to control individual components or subsystems of the vehicle 11 in a distributed fashion.

The computing system 14 may include one or more processors 58 (which could include at least one microprocessor) for controlling overall operation of the computing system 14 and associated components, and which executes instructions stored in a non-transitory computer readable medium, such as the memory 54. The processor(s) 58 may be implemented with one or more general-purpose and/or one or more special-purpose processors. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other.

The computing system 14 may include RAM 50, ROM 52, and/or any other suitable form of computer-readable memory. A computer-readable storage or memory 54 includes any medium that participates in providing data (e.g., instructions), which may be read by a computer. Such a medium may take many forms, including, but not limited to, non-volatile media, volatile media, etc. The memory 54 may contain data 60 and/or instructions 56 (e.g., program logic) executable by the processor(s) 58 to execute various functions of the vehicle 11, including those described herein. The memory 54 may contain additional instructions as well, including instructions to transmit data to, receive data from, interact with, or control one or more of the vehicle systems and/or components described herein (for example, motive power system 26, sensor system 28 (including sensor deployment mechanism controls used for deployment and retraction of the pillar-mounted sensors as described herein), computing system 14, and the communication interfaces 16).

The vehicle 11 may be configured so that the computing system 14, sensor system 28, actuatable sub-systems 18, 20, 22, 26 and other systems and elements thereof can communicate with each other using a controller area network (CAN) bus 33 or the like. Via the CAN bus and/or other wired or wireless mechanisms, the computing system 14 may transmit messages to (and/or receive messages from) the various vehicle systems and components. Alternatively, any of the elements and/or systems described herein may be directly connected to each other without the use of a bus. Also, connections between the elements and/or systems described herein may be through another physical medium (such as wired connections) or the connections may be wireless connections.

Figure 2:
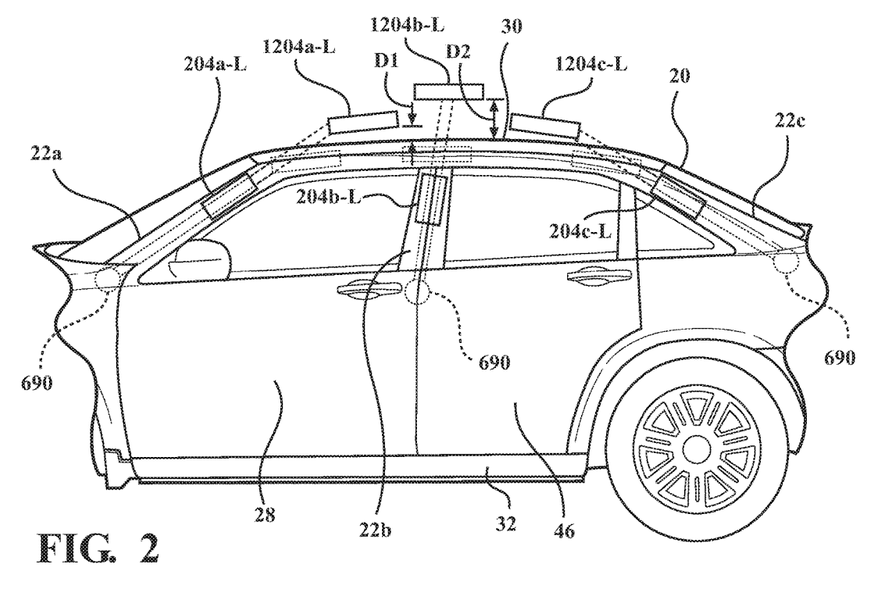
FIG. 2 is a side schematic view of a portion of a vehicle body illustrating the "A", "B" and "C"-pillar structures on a conventional motor vehicle frame (for example, a frame of a passenger sedan).
Figure 3:
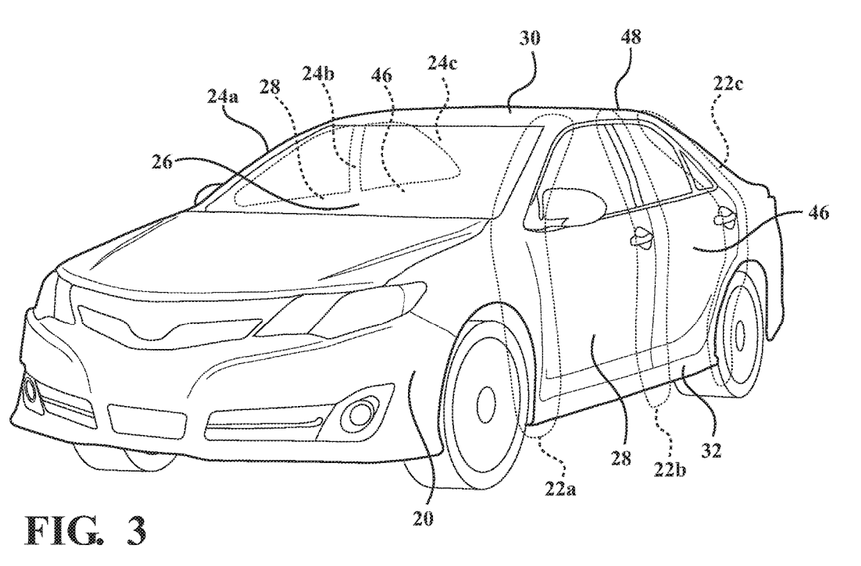
FIG. 3 is a perspective view of the vehicle body of FIG. 2, also showing the vehicle "A", "B" and "C"-pillar structures.

Referring to FIGS. 1-13 at least a portion of the sensors 28 incorporated into the vehicle may be extensible/retractably mounted in pillar structures of the vehicle 11. FIG. 2 is a schematic side view of a portion of a vehicle body 20 illustrating the "A", "B" and "C"-pillar structures on a conventional motor vehicle frame (for example, a frame of a passenger sedan). FIG. 3 is a perspective view of the vehicle body of FIG. 2, also showing the "A", "B" and "C"-pillar structures. In the example shown, the "A", "B" and "C"-pillar structures may extend along each of the left and right sides of the vehicle in a known manner, generally from left and right sides of the roof panel 30 down to respective left 32 and right (not shown) side sills.

Vehicle body 20 has a first "A"-pillar structure 22a extending along a first side of the vehicle and a second, similar "A"-pillar structure 24a extending along an opposite side of the vehicle and opposite first "A"-pillar structure 22a. Vehicle body 20 also has a first "B"-pillar structure 22b extending along a first side of the vehicle and a second, similar "B"-pillar structure 24b extending along an opposite side of the vehicle and opposite first "B"-pillar 22b. Vehicle body 20 also has a first "C"-pillar structure 22c extending along a first side of the vehicle and a second, similar "C"-pillar structure 24c extending along an opposite side of the vehicle and opposite first "C"-pillar structure 22c. As shown in FIGS. 2 and 3, each of "A"-pillars 22a and 24a extends between the front windshield 26 and an associated one of front doors 28 of the vehicle. Also, each of "B"-pillars 22b and 24b extends between an associated one of front doors 28 of the vehicle and an adjacent one of rear doors 46 of the vehicle. Also, each of "C"-pillars 22c and 24c extends between an associated one of rear doors 46 and rear windshield 48. The pillar structures may incorporate reinforcement features as known in the art to aid in supporting the vehicle weight during rollover events. The pillar structures may also be designed to include one or more hollow portions.

In embodiments described herein, one or more of the vehicle sensors may be mounted in deployable sensor pods which are extendably/retractably mounted in the pillar structures of the vehicle. Some possible locations of deployable sensor pods are shown schematically in FIG. 2, which shows pods 204a-L, 1204a-L, 204b-L, 1204b-L, 204c-L, and 1204c-L. As used herein, "extend" "deploy", "deploys", and "deployment" or any form thereof with reference to a sensor pod refers to the process of the sensor pod leaving its housing when proceeding from a stowed position to a "deployed" or "use" position. The term "retract" or "stow" in reference to a sensor pod may refer to movement of a sensor pod from a deployed position to or toward a stowed position in its respective housing. A "stowed" or "retracted" position of a sensor pod is a position wherein the pod is positioned in a pillar structure such that an outer surface of the pod cover as described herein is flush with an outer surface of the pillar structure in which it is mounted. "Deployed", "deployed condition", and "deployed position" or any variation thereof in reference to a sensor pod describes a position of the sensor pod when it is extended from its housing such that sensors contained therein are in a ready-to-use position (i.e., where the sensors contained within the pod may be used for their intended sensing purposes). "Stowed" in reference to a sensor pod refers to a position of the sensor pod when it is not deployed (i.e., when it is fully retracted within its housing). Also, in certain embodiments, the sensor pods described herein may be independently controllable. That is, one or more of the pods may be deployed without necessarily deploying other pods.

Figure 4:
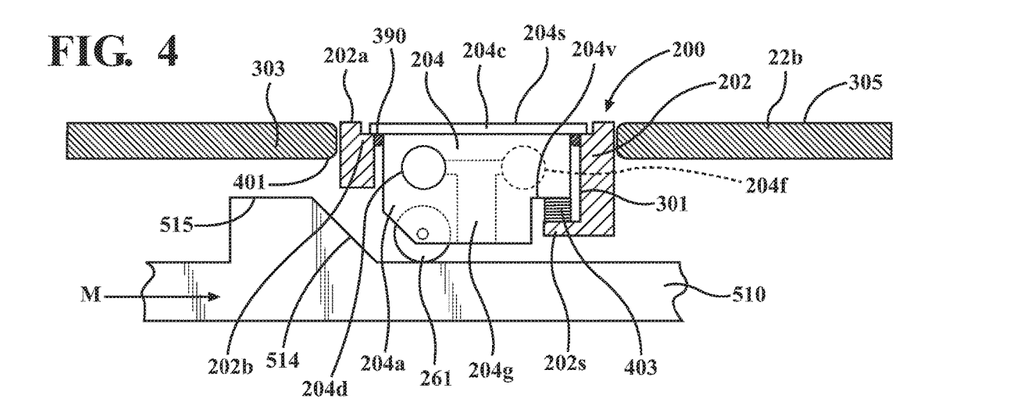
FIG. 4 is a cross-sectional view of one embodiment of a sensor pod assembly incorporated into a vehicle pillar, in a stowed position.
Figure 5:
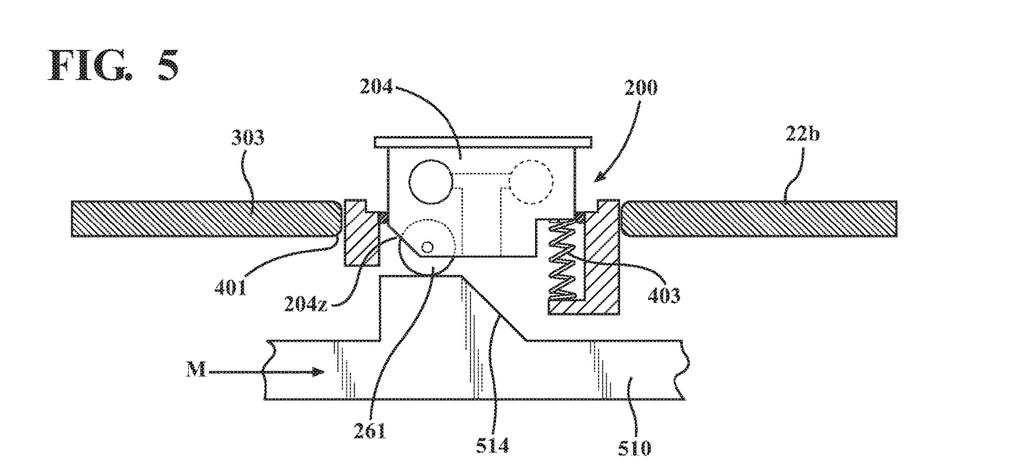
FIG. 5 shows the sensor pod assembly of FIG. 4 in a deployed condition.
Figure 6:
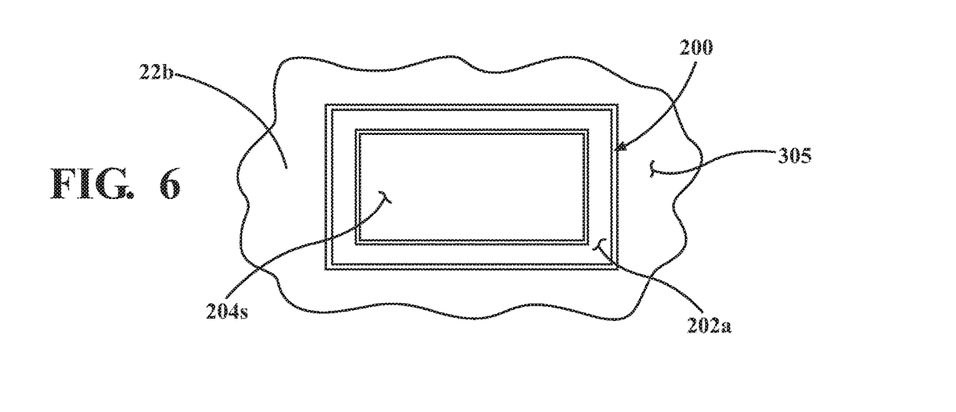
FIG. 6 is a plan view of the sensor pod assembly shown in FIG. 4.

FIG. 4 is a cross-sectional view of one embodiment of a sensor pod assembly 200 incorporated into a vehicle pillar (for example, a "B"-pillar 22b). In FIG. 4, a pod 204 of the pod assembly 200 is in a stowed or retracted condition. FIG. 6 is a plan view of the pod assembly shown in FIG. 4. FIG. 5 shows the pod assembly of FIGS. 4 and 6 in a deployed condition. FIGS. 4-6 also show the pod assembly 200 mounted in vehicle pillar 22b.

In the embodiment shown in FIGS. 4-6, pod assembly 200 has a housing 202 and a sensor pod 204 movably mounted within the housing. The embodiment shown in FIGS. 4-6 is configured for incorporation into a portion of a pillar structure lying between a sill of the vehicle (for example, sill 32 shown in FIG. 2) and the roof panel 30. Examples of suitable locations for the pod assembly embodiment are shown in FIG. 2, where left side pod assemblies 200a-L, 200b-L, 200c-L may be mounted in associated ones of left side pillars 22a, 22b, and 22c in FIG. 2. However, a pod assembly having the configuration shown in FIGS. 4-6 may be incorporated into any portion of the pillar structure through which passes an embodiment of a deployment stalk (as described in greater detail below).

Referring to FIGS. 4-6, pod assembly 200 housing 202 may be structured to be positionable and securable within a complementary cavity 401 formed in pillar 22b. Although the pod assembly 200 in FIGS. 4-6 is shown mounted in "B"-pillar 22b for purposes of description, it will be understood that the assembly described may be positioned within any of pillars 22a, 24a, 22b, 24b, 22c, 24c. The housing outer dimensions may be configured as needed to fit inside the associated cavity.

Housing 202 may be secured to a wall 303 of the pillar 22b or to a feature (not shown) located within an interior of the pillar. Housing 202 may be secured within the pillar 22b using any suitable means, for example, welding, mechanical fasteners, etc. In particular embodiments, the housing is secured within the pillar (for example, using mechanical fasteners) so as to be easily removable for servicing. When the housing 202 is mounted in the pillar 22b, the pod assembly 200 extends into a body of the pillar 22b and is secured within the pillar. In addition, for aesthetic reasons, an outer surface 202a of the housing 202 may be shaped, contoured and/or textured so as to blend and be flush with the outer surfaces 305 of the pillar 22b which surround the housing 202 when the housing is mounted in the pillar.

Housing 202 includes a cavity 301 formed therein. Cavity 301 is structured for movably mounting sensor pod 204 therein. A shoulder 202b may be recessed into the cavity 301 from the housing outer surface 202a to provide a seat for the sensor pod cover 204c (described below) when the pod 204 is in a retracted or stowed position. Housing 202 may be formed from any suitable material or materials (for example, steel or another metallic material, a polymer, etc.).

Housing 202 may also include a mechanism (described below) for biasing the sensor pod 204 toward a stowed position. In the embodiment shown in FIGS. 4 and 5, an attachment shoulder 202s is provided for securing one end of a biasing mechanism in the form of a tension-type coil spring (shown schematically as element 403) thereto. However, the housing 202 may alternatively be structured to enable attachment or mounting of other types of spring elements thereto, depending on the requirements of a particular application. In the particular embodiment shown in FIGS. 4 and 5, a spring attachment surface 204v is provided on base 204a for attaching an end of a spring member 403 thereto. Other types of biasing mechanisms may also be provided.

Housing 202 may be structured to facilitate mounting or attachment of a weather seal 390 along a perimeter of the opening 301. Seal 390 is structured to slidingly engage the sensor pod 204 in an interference fit so as to aid in preventing moisture and other foreign matter and/or contaminants from entering an interior of the pillar. Seal 390 may be any form of seal suitable for the purposes described herein, for example, an O-ring or elastomeric gasket, a foam material, etc.

Referring to FIGS. 4 and 5, sensor pod 204 may be slidably mounted within housing 202. Sensor pod 204 has a base 204a and a cover 204c attached to a side of the base 204a residing adjacent the exterior surface 202a of the housing 202. Base 204a may have one or more cavities 204d and 204f structured for mounting various types of sensors therein. Cavities 204d and 204f may be formed in exterior walls of the base 204a to enable access of the sensors to the external environment of the vehicle when the sensor pod is deployed. The pod cavities may be formed in the base so as to open in any desired direction or directions, so as to direct the field of view of the sensors in desired directions. Base 204a may also have one or more cavities 204g formed therein to permit passage of wiring or cables therethrough, from an exterior of the base to any sensors mounted in sensor-receiving cavities 204d and 204f. Examples of types of sensors that may be mounted in the base cavities 204d and 204f include radar sensors, lidar, other optical sensors, sonar-type sensors, and cameras, to name a few. However, any suitable alternative type of sensor may also be mounted in the base 204.

In the embodiment shown in FIGS. 4 and 5, the sensor cavities 204d and 204f are structured so that the sensors face in opposite directions, from opposite sides of the base 204a. However, any cavity (or cavities) may be structured so as to orient the sensor contained therein in any desired direction when the pod is deployed. In addition, while the embodiment of the base 204a shown in FIGS. 4 and 5 includes two sensor cavities, a base may have fewer or more sensor-receiving cavities disposed therein, depending on such factors as the size and geometry of the sensor to be positioned in the cavity, its detection range, its desired field of view (i.e., the direction in which the sensor is facing for detection purposes), and other pertinent factors.

In the embodiment shown in FIGS. 4 and 5, one or more stalk-engaging elements 261 formed on or coupled to the base 204a. Stalk-engaging element(s) 261 are structured and positioned to engage a ramp surface 514 of a deployment stalk 510 (described in greater detail below), in order to extend the base 204a from the housing 202, thereby deploying the sensor pod 204. In the embodiments shown, the stalk-engaging element 261 is in the form of a roller rotatably coupled to the base 204a. However, the stalk-engaging element may alternatively be in the form of a sloped surface (for example, surface 204z of FIG. 5 or a similarly configured surface) configured to complementarily engage stalk ramp surface 514 during motion of the stalk 510. In this embodiment, the engaging sloped surfaces may be structured (for example, through the use of suitable low-friction materials) so as to minimize friction between the surfaces. The stalk-engaging element may alternatively have any other suitable form. Cover 204c has an outer surface 204s which may be, for aesthetic reasons, shaped, contoured and/or textured so as to blend and be flush with the outer surface 305 of the pillar 22b and the housing outer surface 202a when the sensor pod 204 is in a stowed position.

The particular geometries of the portions of the pod base 204a and housing 202 to which the spring element(s) are attached may depend on such factors as the geometric shape of the spring elements used (i.e., coil, cantilever, torsion, for example), the force-deflection modes of the spring elements (i.e., tension, compression, torsion, for example), and the geometry of the pillar interior (which may affect the space within the pillar interior available for the sensor pod assembly), among other factors. The constituents of pod 204 may be formed from any suitable material or materials (for example, steel other metallic materials, polymers, etc.).

Referring to FIGS. 4 and 5, the sensor pod biasing mechanism may be structured to bias the sensor pod 204 toward the stowed position shown in FIG. 4. In the embodiment shown in FIGS. 4 and 5, the biasing mechanism is in the form of one or more spring elements 403 operatively connecting the housing 202 and base 204a. Although FIGS. 4 and 5 show only a single spring element (shown schematically as element 403) extending between the base 204a and the housing 202, two or more spring elements may be used according to the needs of a particular application.

Spring element(s) 403 may be any type(s) of spring(s) suitable for the purposes described herein. In FIGS. 4 and 5, spring element(s) 403 are shown schematically in the form of coil springs. The spring element(s) shown in the embodiment of FIGS. 4 and 5 are in tension (i.e., at least slightly stretched or increased in length from their unloaded condition(s)) due to the need for the spring element(s) to bias the sensor pod 204 toward a stowed position. In this embodiment, the action of deploying the sensor pod 204 outwardly from the pillar acts to further stretch and lengthen the spring(s). The length of the spring element(s) would then decrease as the spring(s) urges the sensor pod toward the stowed position.

Although the spring element(s) in FIGS. 4 and 5 are represented as coil spring(s), alternative types of springs may be used (for example, cantilever-type springs or any other suitable type of spring member). In addition, the housing 202 and the base 204a may be alternatively structured so that one or more spring elements operate in a compression mode rather than a tension mode, when the sensor pod 204 is in the deployed position. In this mode, the spring(s) would be in compression (i.e., at least slightly decreased in length from their unloaded condition(s)) due to the need for the spring element(s) to bias the sensor pod 204 toward a stowed position. The action of deploying the sensor pod 204 outwardly from the pillar would act to further compress and shorten the spring(s). The length of the spring element(s) would then increase as the spring(s) urges the sensor pod toward the stowed position.

The shapes and/or number of spring(s) used may also depend on the force-deflection characteristics achievable with a particular spring design, and the space available for positioning and attachment of the spring(s). The spring(s) used may exhibit sufficient elastic deformability to permit the sensor pod 204 to fully deploy and remain in the deployed position for extended periods of time, while still providing sufficient force to fully retract the sensor pod 204 when a stalk (for example, stalk 510) on which the pod is mounted is retracted.

Figure 7:
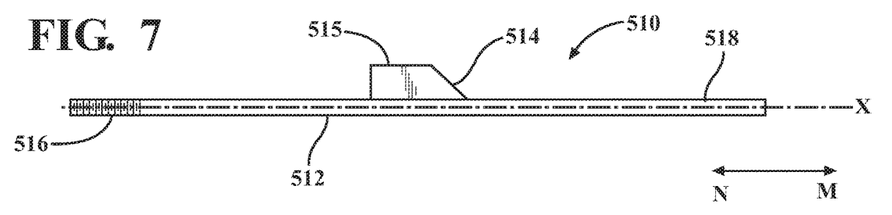
FIG. 7 is a side view of one embodiment of a sensor pod deployment stalk.

FIG. 7 shows one embodiment of a sensor pod deployment stalk 510. Stalk 510 is generally configured to permit movement of the stalk within an associated pillar to a degree necessary for deploying and/or enabling retraction of the sensor pods 204 and 1204 as described herein. In the embodiment shown, stalk 510 comprises a generally cylindrical rod portion 512. Alternatively, one or more portions of the stalk may have non-cylindrical or non-circular cross-sectional shapes. A ramp portion 514 is formed along the rod or otherwise attached to the rod. The ramp portion 514 is structured and positioned along the stalk for engaging roller element 261 of the sensor pod 204 in the manner described herein, so as to deploy the pod during travel of the stalk in a first or pod deployment direction. Stalk 510 may have an end 516 configured for engaging a suitable stalk driving mechanism. For example, end 516 of the stalk may be threaded so as to engage a complementarily threaded rotating member (not shown) of a stalk driving mechanism 690 in the form of a suitable motor and an associated gear train (if required) or other mechanism (FIG. 2) positioned in or adjacent the B-pillar 22b. Engagement between the stalk threads and the rotating member threads due to rotation of the threaded member may cause the stalk 510 to move along a longitudinal axis X of the stalk. Gears incorporated into any driving mechanism embodiment described herein may be spur gears, rack gears, worm gears, bevel gears, helical gears, and/or any other type of gears suitable for the purposes described, depending on the location of the motor in relation to the stalk, the amount of space available for the gear train, and other pertinent factors.

The driving mechanism 690 may include a reversible motor so that rotation of the motor in one direction produces interengagement of the threads which moves the stalk 510 in a first or sensor deployment direction (for example, direction "M" shown in FIG. 7), while rotation of rotation of the motor in the opposite direction moves the stalk in a second or sensor retraction direction (for example, direction "N" shown in FIG. 7) opposite the first direction. Alternatively, a suitable gear mechanism (such as a gear train)(not shown) may be provided to operatively couple the driving mechanism 690 to the stalk 510 so that the stalk moves in directions "M" and "N". Other means of producing motion of the stalk 510 as described are also contemplated. Another end 518 of the stalk may be structured for mounting another, end-mounted sensor pod 1240 (described in greater detail below) thereto. Stalk 510 may be formed from any suitable material or materials (for example, steel or another metallic material, a polymer, etc.).

Figure 8:
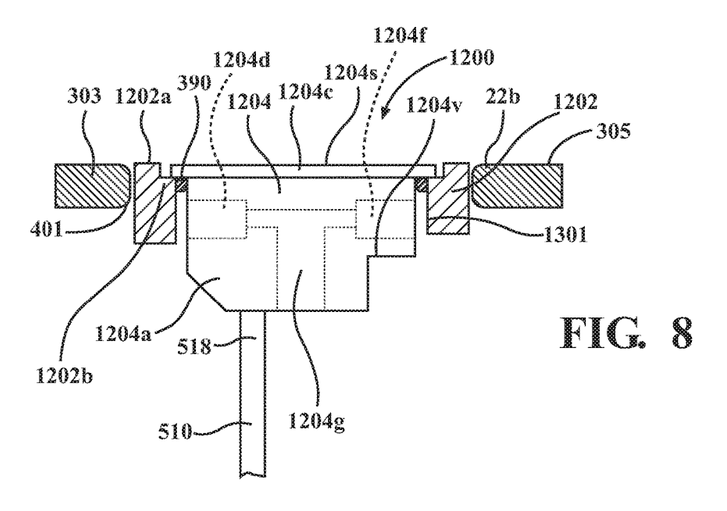
FIG. 8 shows another embodiment of a sensor pod in a stowed position, at a location in a pillar different from the location of the sensor pod of FIG. 4.
Figure 9:
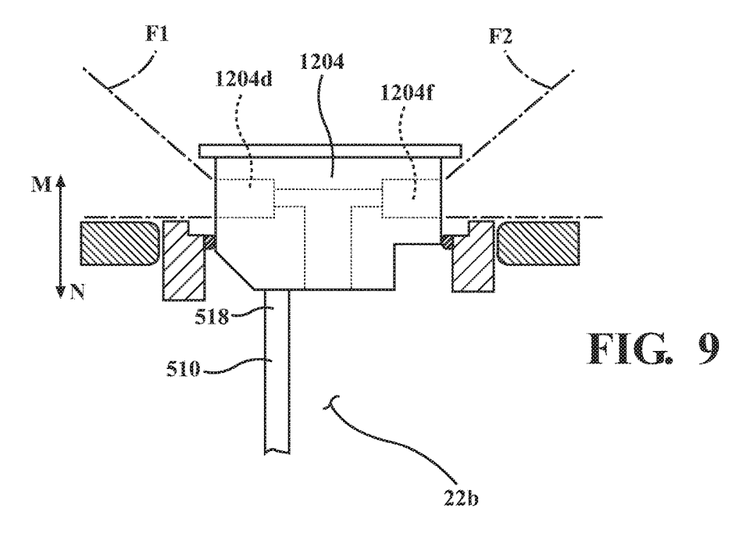
FIG. 9 shows the sensor pod assembly of FIG. 8 in a deployed condition.

FIGS. 8 and 9 are schematic views similar to FIGS. 4 and 5 illustrating the structure and operation of an alternative embodiment 1200 of the sensor pod assembly. The pod assembly embodiment shown in FIGS. 8 and 9 has a structure similar to that or pod assembly 200 shown in FIGS. 4 and 5, except that the biasing member 403 and roller element 261 of FIGS. 4 and 5 are omitted because the sensor pod 1204 is attached to deployment stalk 510, and movement of the sensor pod 1204 into and out of its housing 1202 is controlled by movement of the stalk. Elements in FIGS. 8 and 9 similar to those shown in FIGS. 4 and 5 have similar reference numerals, unless otherwise noted. The pod assembly 1200 shown is mounted on the end of a stalk 510 positioned within pillar 22b. However, a similar end-mounted pod assembly may be located on ends of stalks residing with any of the other pillars (22a, 22c, etc.).

FIG. 8 shows the sensor pod 1204 in the stowed position, as previously described. When stalk 510 moves in direction "M" as described herein, the attached sensor pod 1204 is deployed from its housing 1202 to a deployed position (shown in FIG. 9) outside the pillar 22b in which it is mounted. It may be seen that, in the deployed position of the pod 1204 shown in FIG. 9, the sensor-mounting cavities 1204d and 1204f are positioned above the level of the pillar outer surface 305, thereby providing fields of view F1 and F2 for the sensors mounted in cavities 1204d and 1204f. When stalk 510 moves in direction "N", the attached sensor pod 1204 is retracted toward the stowed position shown in FIG. 8.

Figure 10A:
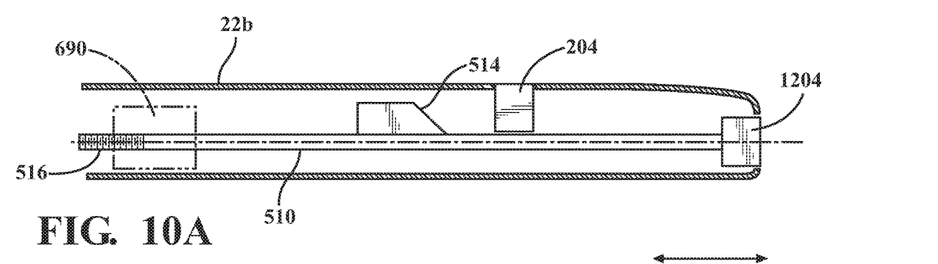
FIGS. 10A-10C are cross-sectional views of a vehicle pillar showing one embodiment of phases of deployment of a pair of sensor pods.

FIGS. 4, 5, 8, 9, and 10A-10C illustrate a pod deployment mode in accordance with one embodiment described herein. FIGS. 4 and 8 show cross-sectional side views of the sensor pod assemblies 200 and 1200 prior to pod deployment. An embodiment of a sensor pod deployment mechanism includes deployment stalk 510 and driving mechanism 690. The driving mechanism may include a suitable motor and gearing mechanism (if needed), as previously described. FIGS. 5 and 9 show cross-sectional side views of the sensor pod assemblies 200 and 1200 when the pods are deployed. Referring to FIGS. 4, 5, 8, 9, and 10A-10C, when driving mechanism 690 is powered so as to move the stalk in direction "M", the end sensor pod 1204 is deployed to a first deployed distance D1 from the pillar structure 22b (as seen in FIG. 10A). At the same time, movement of the stalk 510 in direction "M" moves the ramp surface 514 toward roller element 261. When the ramp surface 514 engages the roller element 261, the roller element 261 and the pod 204 attached thereto ride up the ramp 514, thereby deploying the pod 204. The roller element 261 and the pod 204 ride up the ramp 514 until the roller element 261 reaches surface 515 of the stalk 510, at which point the pod 204 is fully deployed. At the same time, further movement of the stalk in direction "M" moves the end-mounted pod 1204 from a distance D1 out to a distance D2 from the pillar structure 22b.

When it is desired to retract the deployed pod 204, the driving mechanism 690 is powered so as to move the stalk 510 in direction "N" (i.e., opposite direction "M"). This movement causes the end sensor pod 1204 to retract back toward its housing 1202 in pillar 22b. At the same time, the ramp portion 514 of stalk 510 reaches the roller element 261, after which the roller element rides back down along the ramp. Because the pod 204 is biased by biasing member 403 toward a stowed position within its housing 202, the biasing member 403 forces the pod 204 to retract back into its stowed position within housing 202 when the roller element is no longer supported by ramp portion 514. At the same time, further movement of the stalk 510 in direction "N" retracts end-mounted pod 1204 back into its housing 1202 and the stowed position shown in FIG. 8.

Figure 10B:
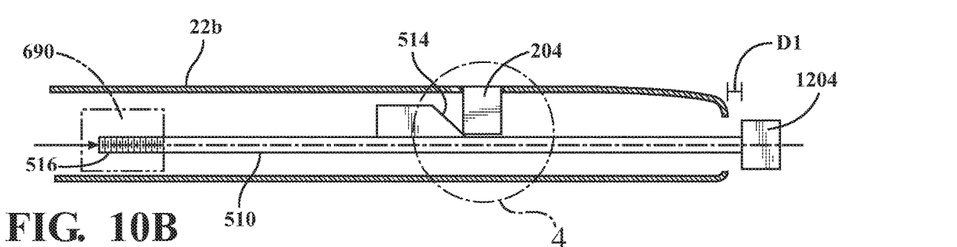
Figure 10C:
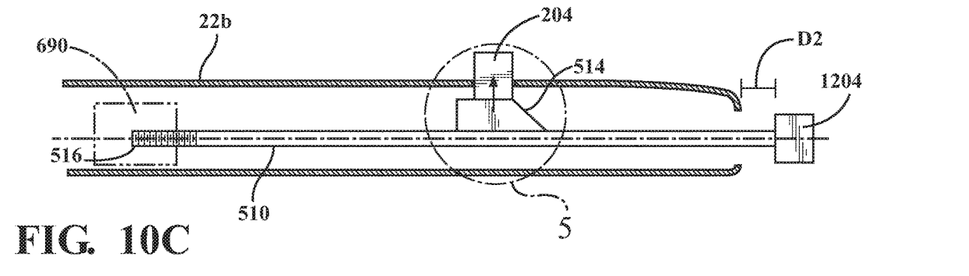

In the deployment just described, as the stalk 510 first moves in direction "M" during pod deployment, the distance of the ramp portion 514 from the roller element 261 imposes a delay before the roller element 261 engages the ramp 514. Thus, before the roller element 261 engages the ramp portion 514, the end pod 1204 deploys to a first distance D1 from the pillar structure 122b. When the stalk 510 moves far enough in direction "M", the roller element 261 engages the ramp portion 514 and pod 204 deploys as previously described. In addition, continued movement of the stalk in direction "M" moves the end pod 1204 father away from pillar 122b, to a second distance D2 from the pillar. Thus, when both pods are deployed, end pod 1204 resides at distance D2 from the pillar. Thus, in this embodiment, the pods 204 and 1204 controlled by a single stalk 1510 may be deployed sequentially. That is, pod 1204 deploys the distance D1 before pod 204 deploys.

In an alternative deployment mode, the driving mechanism 690 may be stopped before ramp 514 engages roller element 261. In this case, only the end pod 1204 would be deployed. If it is desired to also deploy pod 204, the stalk 510 may be moved father in direction "M" as previously described. Thus, either pod 1204 alone or both pods may be deployed.

In other embodiments, the distance of the ramp portion 514 from the stalk end 518 may be controlled such that roller element 261 begins to ride up the ramp 514 as soon as the stalk moves in the deployment direction "M". In this deployment mode, the sensor pods 204 and 1204 may be deployed simultaneously or substantially simultaneously by movement of the stalk in direction "M". Thus, when the pod 1204 is deployed to a distance D1, pod 204 will also be in the deployed position. An embodiment 510' of a stalk showing such a positioning of the ramp portion 514' is shown in FIGS. 11 and 12.

In alternative embodiments, other deployment/retraction mechanisms (for example, a camming system (not shown) in which the pod is actively engaged by a feature formed on or coupled to the stalk 510) may be employed.

Figure 11:
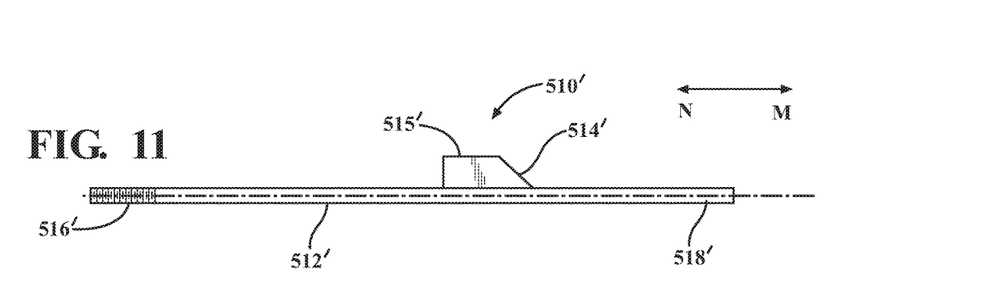
FIG. 11 is a side view of another embodiment of a sensor pod deployment stalk.
Figure 12:
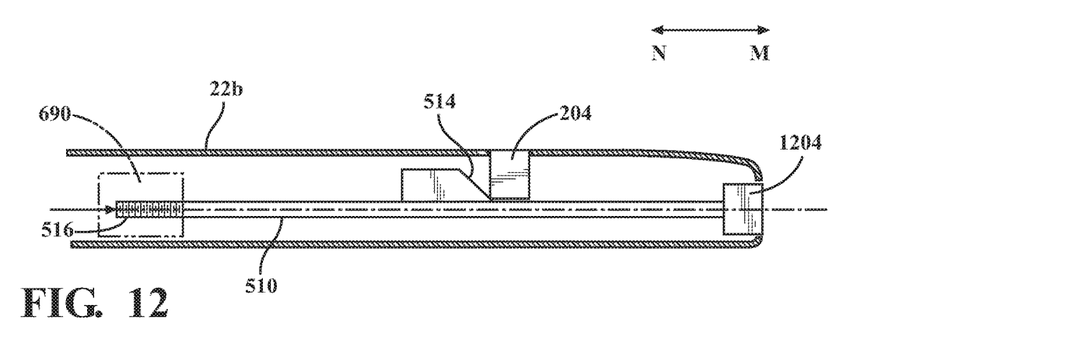
FIG. 12 is a cross-sectional view of a vehicle pillar showing a pre-deployment position of the deployment stalk shown in FIG. 11, along with associated sensor pods.

In another aspect, the vehicle may incorporate one or more stalks configured as shown in FIGS. 10A-10C, and one or more stalks configured as shown in FIGS. 11-12. Such an embodiment of the vehicle is shown in FIG. 2. In this embodiment, the left center or "B"-pillar 22b includes a stalk 510 are configured as shown in FIGS. 10A-10C and pods 204b-L (in assembly 200b-L) and 1204b-L positioned for staged or sequential deployment as previously described. Also, the other pillars ("A"-pillar 22a and "C"-pillar 22c) each include a stalk 510 configured as shown in FIGS. 11-12 and associated pods (204a-L, 1204a-L, 204c-L, 1204c-L) are positioned for simultaneous deployment as previously described. In the final deployed positions of the end pods 1204a-L, 1204b-L, 1204c-L shown in FIG. 2, the end pod 1204b-L on the "B"-pillar stalk (deployed to a distance D2) is higher than either of the end pods 1204a-L and 1204c-L (deployed to a distance D1) on the "A" or "C"-pillar stalks. This arrangement aids in avoiding occlusion of the sensors mounted in the "B"-pillar pod. Also, in this configuration, all of the lower pods 204a-L, 204b-L, and 204c-L are deployed.

In particular embodiment, the location of the ramp portion along the stalk may be adjusted so as to simultaneously or sequentially deploy the pods as described, and with the final, deployed height or distance of the end pod from the pillar set at any desired distance. This enables adjustment of the relative deployed heights of the end pods while also enabling deployment and retraction of the lower pods, if and when desired. Also, if desired, the motor may be stopped after deployment of the end pod but prior to deployment of a lower pod whose deployment is controlled by the same stalk. This enables a degree of selectivity in deployment and retraction of the pods controlled by a single stalk.

Figure 13:
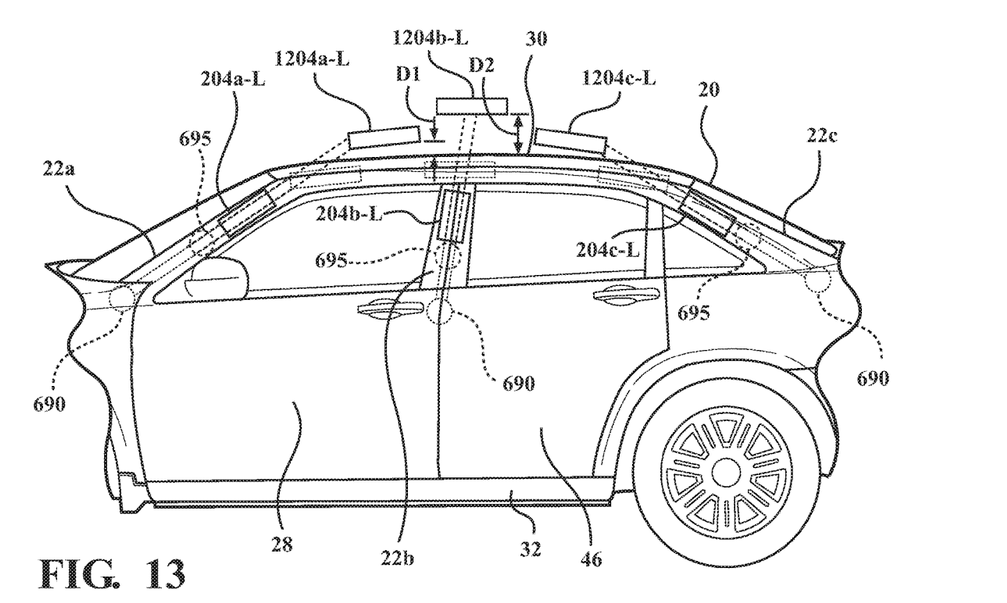
FIG. 13 is a side schematic view of a portion of a vehicle body illustrating the provision of separate deployment mechanisms for each of the sensor pods mounted in the vehicle pillars.

In another embodiment, a separate and independently operable deployment mechanism may be used to control each of the sensor pods 204 and 1204. For example, referring to FIG. 13, a powered driving mechanism and associated elements may be positioned within each pillar structure so as to enable independent deployment and control of each sensor pod in the pillar. For example, FIG. 13 shows a separate driving mechanism 695 (for example, a motor and an associated gear train (if required), or other mechanism) operatively coupled to each of pods 204c-L, 204b-L, and 204c-L for controlling deployment and retraction of the respective sensor pod. Also, a separate driving mechanism 690 (for example, a motor and an associated gear train (if required), or other mechanism) is operatively coupled to each of end pods 1204a-L, 1204b-L, and 1204c-L, for controlling deployment and retraction of the respective sensor pod using stalks as previously described. This arrangement provides independent control of each sensor pod.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle sensor system comprising:
   a first sensor pod mounted to a pillar structure of the vehicle;
   a second sensor pod mounted to the pillar structure; and
   a sensor pod deployment mechanism operatively coupled to the first sensor pod and to the second sensor pod for deploying the first and second sensor pods, the mechanism being operable to move the first sensor pod between a stowed position and a deployed position, and operable to move the second sensor pod between a stowed position and a deployed position.

2. The sensor system of claim 1 wherein the first sensor pod is structured to be flush with an exterior surface of the pillar structure when the first sensor pod is in the stowed position, and the second sensor pod is structured to be flush with an exterior surface of the pillar structure when the second sensor pod is in the stowed position.

3. The sensor system of claim 1 wherein the deployment mechanism comprises a stalk mounted in the pillar structure so as to be movable within the pillar structure, the stalk including an end portion coupled to the first sensor pod such that movement of the stalk in a first direction moves the first sensor pod toward a deployed position.

4. The sensor system of claim 3 wherein the stalk includes a ramp portion structured for engaging the second sensor pod so as to move the second sensor pod toward a deployed position during movement of the stalk in the first direction.

5. The sensor system of claim 4 wherein the second sensor pod includes a stalk-engaging element structured to engage the stalk ramp portion so as to move the second sensor pod toward the deployed position during movement of the stalk in the first direction.

6. The sensor system of claim 5 wherein the stalk-engaging element comprises a roller.

7. The sensor system of claim 5 wherein the stalk-engaging element comprises a sloped surface configured to complementarily engage the stalk ramp portion.

8. The sensor system of claim 3 wherein the deployment mechanism further comprises a driving mechanism operatively coupled to the stalk so as to move the stalk in the first direction within the pillar structure and in a second direction within the pillar structure, the second direction being opposite the first direction.

9. The sensor system of claim 8 wherein the stalk end portion is coupled to the first sensor pod such that a movement of the stalk in the second direction moves the first sensor pod in a retraction direction toward a first sensor pod housing.

10. The sensor system of claim 3 wherein the stalk is structured such that movement of the stalk in the first direction moves the second sensor pod from a stowed position toward a deployed position while moving the first sensor pod from a stowed position toward a deployed position.

11. The sensor system of claim 3 wherein the stalk is structured such that movement of the stalk a first movement distance in the first direction moves the first sensor pod from a stowed position to a deployed position a first deployed distance from the pillar structure, without moving the second sensor pod.

12. The sensor system of claim 11 wherein the stalk is structured such that movement of the stalk a second movement distance in the first direction greater than the first movement distance moves the first sensor pod to a second deployed distance from the pillar structure that is greater than the first deployed distance, and also moves the second sensor pod from a stowed position to a deployed position.

13. The sensor system of claim 1 wherein the second sensor pod is operatively coupled to a second sensor pod housing by a biasing mechanism structured to bias the second sensor pod toward a stowed position of the second sensor pod within the housing.

14. The sensor system of claim 1 wherein the deployment mechanism comprises:
   a first driving mechanism operatively coupled to the first sensor pod and configured for moving the first sensor pod between the first sensor pod stowed position and the first sensor pod deployed position, and;
   a second driving mechanism separate from the first driving mechanism, the second driving mechanism being operatively coupled to the second sensor pod and configured for moving the second sensor pod between the second sensor pod stowed position and the second sensor pod deployed position.

15. The sensor system of claim 1 wherein the deployment mechanism comprises a motor and one or more gears operatively coupled to the motor.

* * * * *